US010069290B2

(12) United States Patent
Vilhelmsen

(10) Patent No.: US 10,069,290 B2
(45) Date of Patent: Sep. 4, 2018

(54) SURFACE MOUNTED MULTIPLE CABLE OR WIRE ORGANIZER

(71) Applicant: Kurt Vilhelmsen, Buckley, WA (US)

(72) Inventor: Kurt Vilhelmsen, Buckley, WA (US)

( * ) Notice: Subject to any disclaimer, the term of this patent is extended or adjusted under 35 U.S.C. 154(b) by 0 days.

(21) Appl. No.: 15/620,588

(22) Filed: Jun. 12, 2017

(65) Prior Publication Data

US 2018/0131169 A1   May 10, 2018

Related U.S. Application Data

(62) Division of application No. 14/728,922, filed on Jun. 2, 2015, now Pat. No. 9,680,293.

(60) Provisional application No. 62/006,395, filed on Jun. 2, 2014.

(51) Int. Cl.
   *F16L 3/08* (2006.01)
   *H02G 3/32* (2006.01)
   *H02G 3/30* (2006.01)

(52) U.S. Cl.
   CPC .............. *H02G 3/32* (2013.01); *H02G 3/305* (2013.01)

(58) Field of Classification Search
   CPC .................................. H02G 3/32; H02G 3/305
   See application file for complete search history.

(56) References Cited

U.S. PATENT DOCUMENTS

| 2,956,768 A | * | 10/1960 | Livingston | G09F 7/22 248/278.1 |
| 8,376,294 B2 | * | 2/2013 | Steury | A63G 9/00 248/202.1 |
| 2009/0288344 A1 | * | 11/2009 | Schram | E05D 13/04 49/199 |

* cited by examiner

*Primary Examiner* — Amy Jo Sterling
(74) *Attorney, Agent, or Firm* — Dean Craine; Marisa Whitaker

(57) ABSTRACT

A method for attaching a cable or wire to a support surface comprising the following steps: selecting a connector body with a bottom surface, a coaxially aligned center void, at least two pairs of transversely aligned holes formed on the side walls of the cylindrical body configured to receive a twist tie extended transversely through the connector body, and a center bore formed on the center void; selecting a desired location on a support surface for attaching the connector body; inserting a connector into the center bore or attaching adhesive tape to the bottom surface of the connector body to attach the connector body to the support surface; selecting at least one twist tie and inserting it into two holes formed the opposite sides of the connector body and across the center void; extending a cable or wire transversely over the connector body, and; twisting the opposite ends of the twist tie together to hold the cable or wire over the connector body.

1 Claim, 5 Drawing Sheets

SURFACE MOUNTED MULTIPLE CABLE
OR WIRE ORGANIZER

This is a U.S. division patent application based on U.S. utility patent application (application Ser. No. 14/728,922) filed on Jun. 2, 2015 which is based on and claims the filing date benefit of U.S. provisional patent application (Application No. 62/006,395) filed on Jun. 2, 2014.

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention:

This invention pertains cable or wire organizers, and more particularly to organizers that easily mount to a surface and accommodates multiple cables or wires that cross.

2. Description of the Related Art:

One problem with using electronic devices, such as telephones, computers, fax machines, printers, or power adapter on a desk or workstation is organizing the power cords, network cables, video cables, serial port cables, and USB cables used by the devices. The wires or cables are often a fixed length and extend over or under the desk or workstation from different directions. Sometimes, the wires or cables must cross. Ideally, the cords and cables should be securely attached to an unused area on the desk or workstation.

Velcro strips, zip ties and twist ties have been used to bundle runs of multiple cables or wires together. Because these strips or ties cannot be affixed to a surface, additional clips are often used to hold the cables or wires against a flat surface. Unfortunately, the clips are uni-directional (i.e. designed to hold bundles of cables or wires that are parallel). When the cables or wires are not parallel or cannot be bundled together, or when they cross, separate clips must be used with each cable or wire.

It is also common to add or remove devices from a desktop or workstation every few months. When devices are added or removed from the desktop or workstation, the cable and wires used by the devices are also changed. When zip ties and clips are used to organize and attach the cables or wires to the support surface, they must be cut and replaced when zip ties or clips.

What is needed is a multiple cable or wire organizer that can be permanently or temporarily attached to a support surface, which is reusable, and can be used with crossing cables or wires.

SUMMARY OF THE INVENTION

Disclosed is a cable or wire organizer comprising a rigid connector body with a flat bottom surface, short, perpendicular aligned side walls, and a coaxially aligned recessed center void. Formed in the center void is a bore configured to receive a threaded connector that may be used to selectively attach the connector body to a flat support surface. Formed on the raised side walls are at least two pairs of transversely aligned holes configured to receive a twist tie that extends transversely through two holes formed on opposite sides of the connector body. The twisted tie is centrally aligned over the connecter body so the opposite ends that extend on opposite sides of the connector body are substantially equal in length. The opposite ends of the twisted tie are then bend rearward and over the top surface of the connector body. When one or more cables or wire are extend over the top surface of the connector body, the tips of the twisted ties are twisted together and tighten to securely hold the cables or wires over the top surface of the connector body.

In the embodiment shown herein, the connector body is a cylindrical structure with curved side walls and a flat bottom surface. The holes that extend transversely through the side walls are substantially parallel to the bottom surface. The pairs of holes are approximately $1/8^{th}$ to $1/4$ inch in diameter and aligned approximately 90 degrees apart.

The connector body may be used with twist ties that include an inner wire stiffener covered by an outer layer made of rubber, vinyl, paper or cloth. When bent or twisted, the twist ties are configured to hold their shape and orientation.

During use, the bottom surface of the connector body is aligned at a desired location on a flat support surface. The connector body is rotated on the support surface so the ends of the twist tie that extend through the connector body may be bent and twisted over a single or a bundle of wires that extends over the connector body's top surface. A small strip of double back adhesive tape is applied to the bottom surface of the connector body or a threaded connector is extended through the center bore. A twist tie is inserted through the holes and extend through the connector body so its opposite ends extend outward equal distances. The connector body is then attached to the support surface. A single cable or wire or a bundle of cables or wires is then extended over the top surface of the connector body. Because the twisted tie passes through holes aligned 180 degrees apart, the multiple bundles of wires within the 180 arc may extend over the connector body. The wires, if desired, may cross over the connector boy. A single twist tie may hold one or more bundles or wires. If needed, a second twist tie may be extend through the second pair of holes.

When the cable or wire are to be removed or relocated, or when additional cables or wires are added, the ends of the twist ties may be untwisted and then re-twisted.

DESCRIPTION OF THE PREFERRED EMBODIMENT(S)

Figure 1:
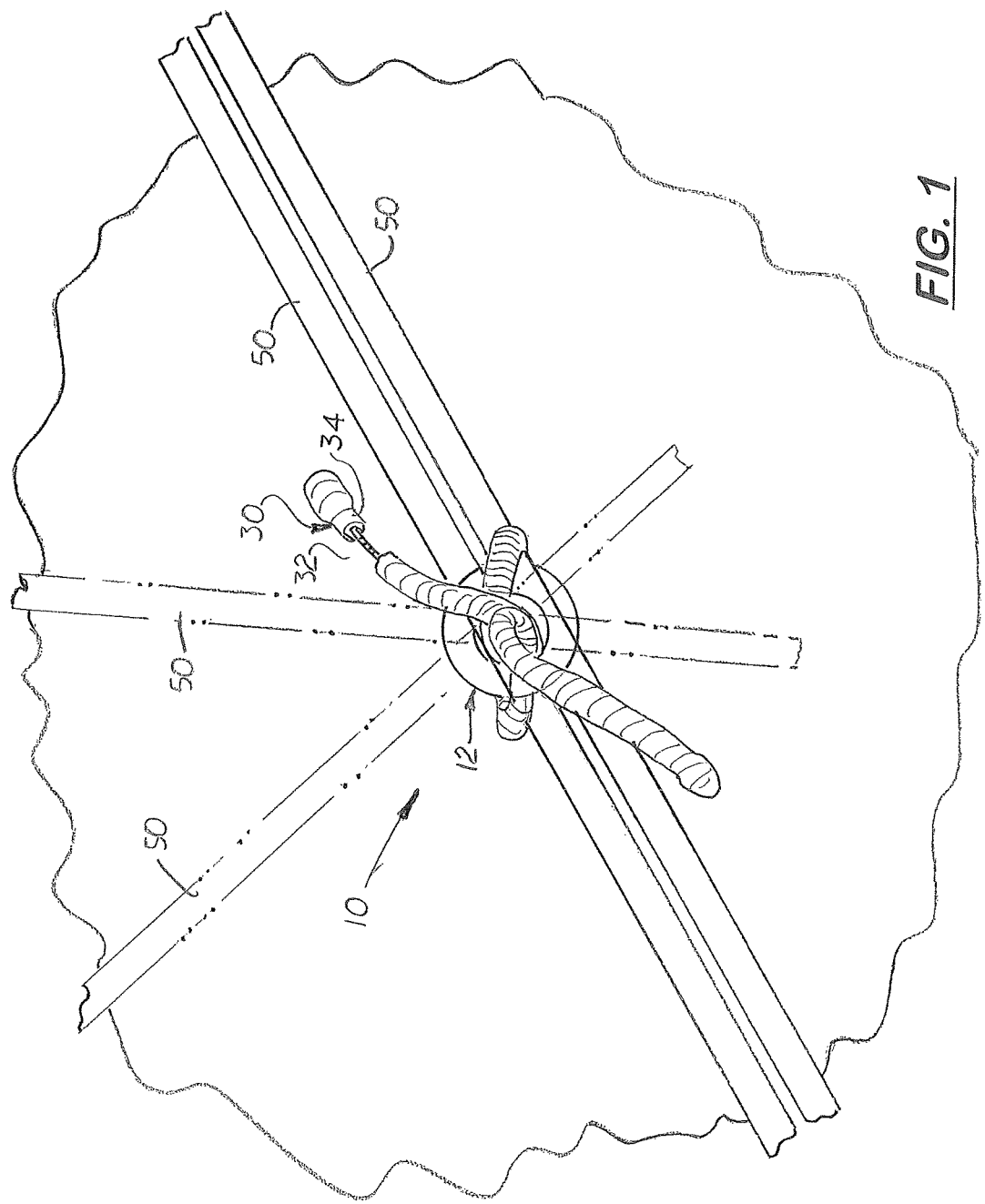
FIG. 1 is a bottom plan view of a substrate surface located under a desktop or workstation that shows two parallel cables and two non-parallel cables extending over a single organizer and held together with a single twist tie.
Figure 2:
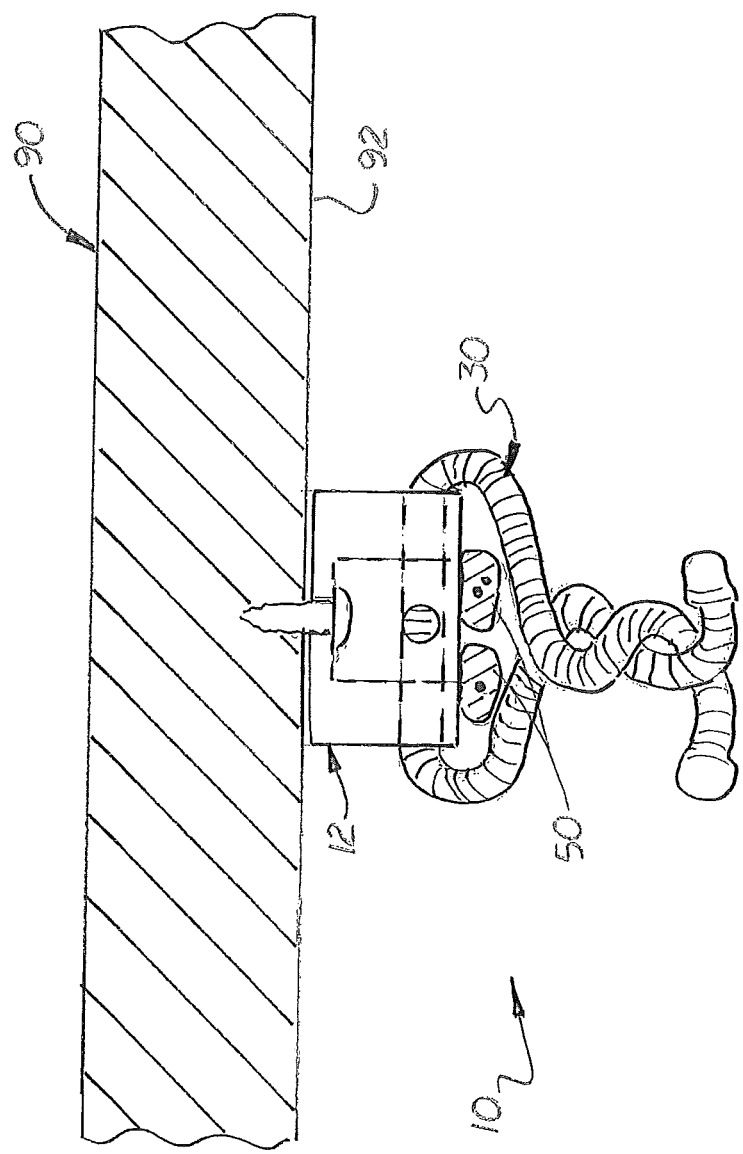
FIG. 2 is a sectional, side elevational view of a desktop or workstation with the organizer attached to the bottom substrate surface of the desktop or workstation and used to hold two cables on the bottom substrate surface.
Figure 3:
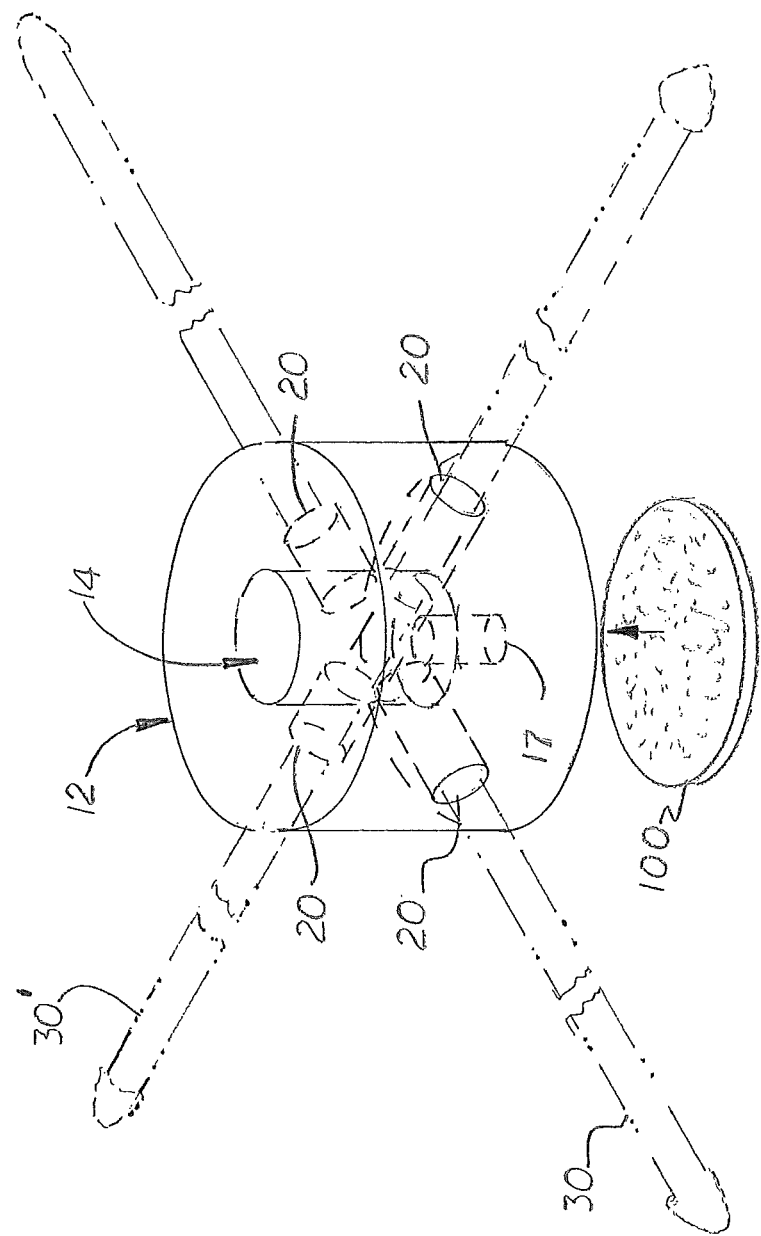
FIG. 3 is a perspective view of two twist wires extending through opposite pairs of holes formed on the connector body and showing a strip of double back tape used to hold the connector body to a support surface.

Referring to the Figs, there is shown a substrate surface mounted multiple cable or wire organizer 10 that includes at least one twist tie 30, and a rigid connector body 12 with a plurality of transversely aligned holes 20 configured to receive the twist tie 30.

The connector body 12 includes a flat bottom surface 16 attached to a flat substrate surface 92. The holes 20 extend transversely through the connector body 12 substantially parallel to the bottom surface 16. During use, at least one twist tie 30 is inserted into the holes 20 axially aligned on opposite sides of the connector body 12.

In the embodiment shown, the connector body 12 is a cylindrical structure with curved side walls 15 and a recessed center void 14 formed therein. Formed inside the center void 14 is a peg hole 16. In the embodiment shown, the connector body 12 measures approximately 1 inch in diameter and the side walls 15 are approximately ½ inch thick. The holes 20 are approximately ¼ inches in diameter. The twist ties 30 include an inner wire stiffener 32 covered by a rubber or vinyl layer 34. When bent or twisted, the twist ties 30 are configured to hold their shape and orientation.

During use, a pair of holes 20 with longitudinally aligned center axis that extend transversely on the connector body 12. The center axis of the holes 20 are substantially perpendicular to at least one cable 50 held by the connector body 12. A twist tie 30 is inserted through the holes 20 and extend through the connector body 12 so its opposite ends extend outward substantially the same distance. A single cable 30 or a bundle or cables is then extended over the top surface 13 of the connector body 12 and the ends of the twist ties 30 are then twisted together to hold the cable or cables 30 over the top surface 13 of the connector body 12.

Figure 4:
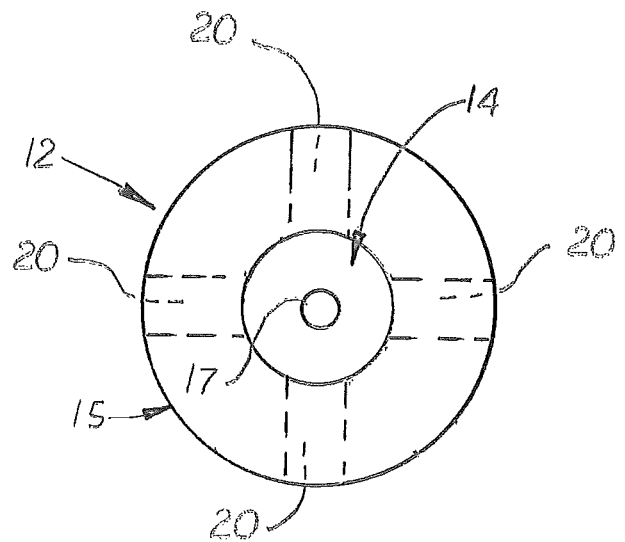
FIG. 4 is a top plan view of the connector body.
Figure 5:
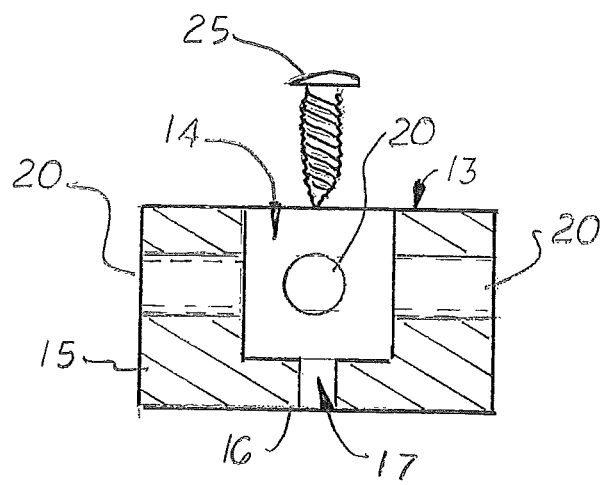
FIG. 5 is a sectional, side elevational view of the connector body and with a threaded connector.

As shown more clearly in FIGS. 4 and 5, recessed center bore 14 is formed in the connector body 12 and a peg hole 17 coaxially aligned with the center bore 14. A threaded connector 25 configured to extend through the peg hole 16 is used to attach the connector body 12 to a substrate surface 92. The center bore 14 is approximately ½ inch in diameter and the peg hole 16 is approximately ⅛ inch in diameter.

Figure 6:
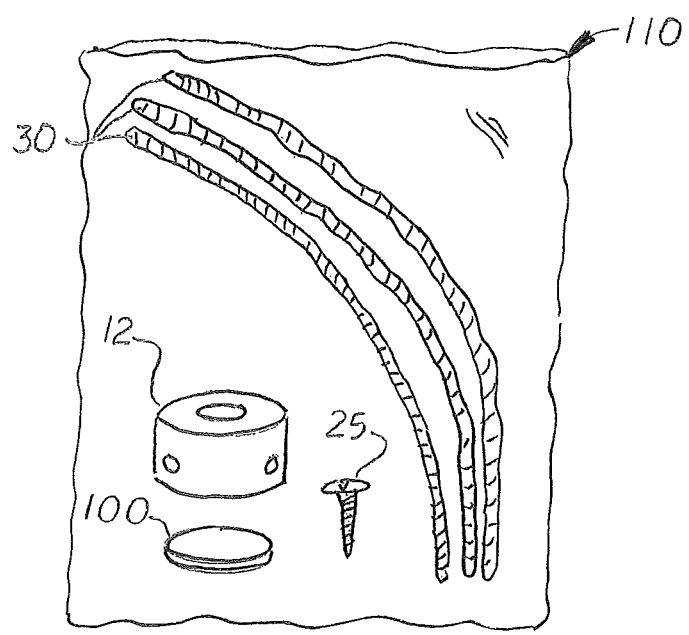
FIG. 6 is a perspective view of a kit version of the showing at least one connector body sold and distributed as a kit with a threaded connector or a strip of double back tape and with a plurality of twist ties in a bag container.

In one embodiment, one or more connectors 12 are sold and distributed with a threaded connector 25 or a strip of double back tape 100. In another embodiment, the connector or connectors may be sold and distributed in a container 100 as kit with one or more twisting ties 30 as shown in FIG. 6.

Using the above connector, a method for one or more cables or wires to a support surface comprising the following steps:

a. selecting an organizer that includes a rigid connector body with a bottom surface and perpendicularly aligned side walls, a coaxially aligned center void and at least two pairs of transversely aligned holes formed on the side walls configured to receive a twist tie disposed transversely through the connector body, and a connector for attaching the bottom surface of the connector body to a support surface;

b. selecting a desired location for attaching the connector body to a support surface when a cable or wire will extend;

c. attaching the connector body to the support surface at the desired location;

d. selecting at least one twist tie with a thickness and length that extends through two holes formed the opposite sides of the connector body and with the opposite ends that extend outward and may be bent upward over the connector body and twisted together;

e. extending the twist tie through two holes formed the opposite sides of the connector body;

extending a cable or wire transversely over the connector body in-between the two holes that receive the twist tie, and;

g. twisting the exposed ends of the twist tie together to hold the cable or wire over the connector body.

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. A method for attaching one or more cables or wires to a support surface, comprising the following steps:

a. selecting an organizer that includes a connector body with a bottom surface, a top surface, and having opposite side walls, a coaxially aligned center void formed on the connector body and at least two pairs of transversely aligned holes formed on the side walls configured to receive a twist tie disposed transversely through the connector body, and a peg hole formed on the center void and extending through the bottom surface, the peg hole configured to receive a connector configured to attach the bottom surface of the connector body to a support surface;

b. selecting a desired location on a support surface for attaching the bottom surface of the connector body to a support surface;

c. inserting a connector into the peg hole or attaching adhesive tape to the bottom surface of the connector body to attach the connector body to the support surface at the desired location;

d. selecting at least one twist tie configured to extend through two holes transversely through the connector body and across the center void, the twist tie having two opposite ends and sufficient in length so that the opposite ends extend outward from the connector body may be bent upward over the top surface and twisted together over a wire or cable extending over the connector body;

e. extending the twist tie through two holes formed in the opposite sides of the connector body and across the center void;

f. extending a cable or wire transversely over the top surface of the connector body, and g. twisting the opposite ends of the twist tie together to hold the cable or wire over the connector body.

* * * * *